(12) United States Patent
Ichimiya (10) Patent No.: US 11,032,453 B2
(45) Date of Patent: Jun. 8, 2021

(54) IMAGE CAPTURING APPARATUS AND CONTROL METHOD THEREFOR AND STORAGE MEDIUM

(71) Applicant: CANON KABUSHIKI KAISHA, Tokyo (JP)

(72) Inventor: Takashi Ichimiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/905,727

(22) Filed: Jun. 18, 2020

(65) Prior Publication Data

US 2020/0404134 A1 Dec. 24, 2020

(30) Foreign Application Priority Data

Jun. 20, 2019 (JP) .............................. JP2019-114932

(51) Int. Cl.
*H04N 5/225* (2006.01)
*H04N 5/232* (2006.01)

(52) U.S. Cl.
CPC ... *H04N 5/22521* (2018.08); *H04N 5/232122* (2018.08)

(58) Field of Classification Search
None
See application file for complete search history.

(56) References Cited

U.S. PATENT DOCUMENTS

| 10,846,839 B2* | 11/2020 | Takikawa | G06T 5/50 |
| 2004/0005098 A1* | 1/2004 | Carrano | G06T 5/003 |
| | | | 382/254 |
| 2010/0045849 A1* | 2/2010 | Yamasaki | G03B 13/34 |
| | | | 348/349 |
| 2013/0222615 A1* | 8/2013 | Arrasmith | G06T 5/003 |
| | | | 348/207.1 |
| 2016/0006936 A1* | 1/2016 | Hattori | H04N 5/21 |
| | | | 382/166 |
| 2016/0202283 A1* | 7/2016 | Wang | G01S 17/58 |
| | | | 356/28 |
| 2017/0353648 A1* | 12/2017 | Katagawa | H04N 5/265 |
| 2018/0352177 A1* | 12/2018 | Komiya | G06T 7/254 |
| 2020/0051261 A1* | 2/2020 | Tsuruyama | G06T 7/50 |

FOREIGN PATENT DOCUMENTS

JP 2015-177477 A 10/2015

* cited by examiner

*Primary Examiner* — James M Hannett
(74) *Attorney, Agent, or Firm* — Cowan, Liebowitz & Latman, P.C.

(57) ABSTRACT

An image capturing apparatus includes a light receiving sensor including two-dimensionally arranged pixels and configured to photoelectrically convert a pair of object images and to output a first image signal and a second image signal, each of the first image signal and the second image signal corresponding to a respective object image of the pair of object images; a calculation unit configured to calculate a first phase difference between the first image signal and the second image signal in the first direction and a second phase difference in a second direction; a focus detection unit configured to calculate a first focus detection result based on the first phase difference; and a determination unit configured to determine presence or absence of heat haze based on the second phase difference.

22 Claims, 10 Drawing Sheets

IMAGE CAPTURING APPARATUS AND CONTROL METHOD THEREFOR AND STORAGE MEDIUM

BACKGROUND OF THE INVENTION

Field of the Invention

The present invention relates to a focus detection technology in an image capturing apparatus.

Description of the Related Art

In the related art, it is known that, in a case where a camera is used to capture an image, a distorted image is captured when a fluctuation in refractive index, that is, heat haze occurs between an object and the camera due to a variation in atmospheric density.

On the other hand, as a focus detection scheme for a camera, a phase difference detection scheme is widely known in which light from an object is separated into two image signals by a separator lens, and a focus state is detected from a phase difference between the two image signals. In a case where focus detection is performed in accordance with a phase difference detection scheme, the two image signals are also distorted to preclude a correct focus detection result from being obtained when heat haze as described above occurs.

As a technique for solving this problem, for example, Japanese Patent Laid-Open No. 2015-177477 proposes a technology for detecting heat haze from motion vectors between frames.

However, in the related technology disclosed in Japanese Patent Laid-Open No. 2015-177477 described above, in a case where the object is a moving body, distinguishing actual movement of the object from distortion of the image caused by heat haze is difficult, leading to possible erroneous determination of heat haze.

SUMMARY OF THE INVENTION

The present invention has been made in view of the problems described above. An object of the present invention is to provide an image capturing apparatus enabling accurate focus detection even in a case where heat haze occurs.

According to a first aspect of the present invention, there is provided an image capturing apparatus comprising: a light receiving sensor including two-dimensionally arranged pixels and configured to photoelectrically convert a pair of object images having passed through a first pupil region and a second pupil region into which a pupil region of an image capturing lens is divided in a first direction and to output a first image signal and a second image signal, each of the first image signal and the second image signal corresponding to a respective object image of the pair of object images; and at least one processor or circuit configured to function as: a calculation unit configured to calculate a first phase difference between the first image signal and the second image signal in the first direction and a second phase difference between the first image signal and the second image signal in a second direction orthogonal to the first direction; a focus detection unit configured to calculate a first focus detection result based on the first phase difference; and a determination unit configured to determine presence or absence of heat haze based on the second phase difference.

According to a second aspect of the present invention, there is provided a control method for an image capturing apparatus, the method comprising: by a light receiving sensor including two-dimensionally arranged pixels, photoelectrically converting a pair of object images having passed through a first pupil region and a second pupil region into which a pupil region of an image capturing lens is divided in a first direction and outputting a first image signal and a second image signal, each of the first image signal and the second image signal corresponding to a respective object image of the pair of object images; calculating a first phase difference between the first image signal and the second image signal in the first direction and a second phase difference between the first image signal and the second image signal in a second direction orthogonal to the first direction; calculating a first focus detection result based on the first phase difference; and determining presence or absence of heat haze based on the second phase difference.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

Figure 1:
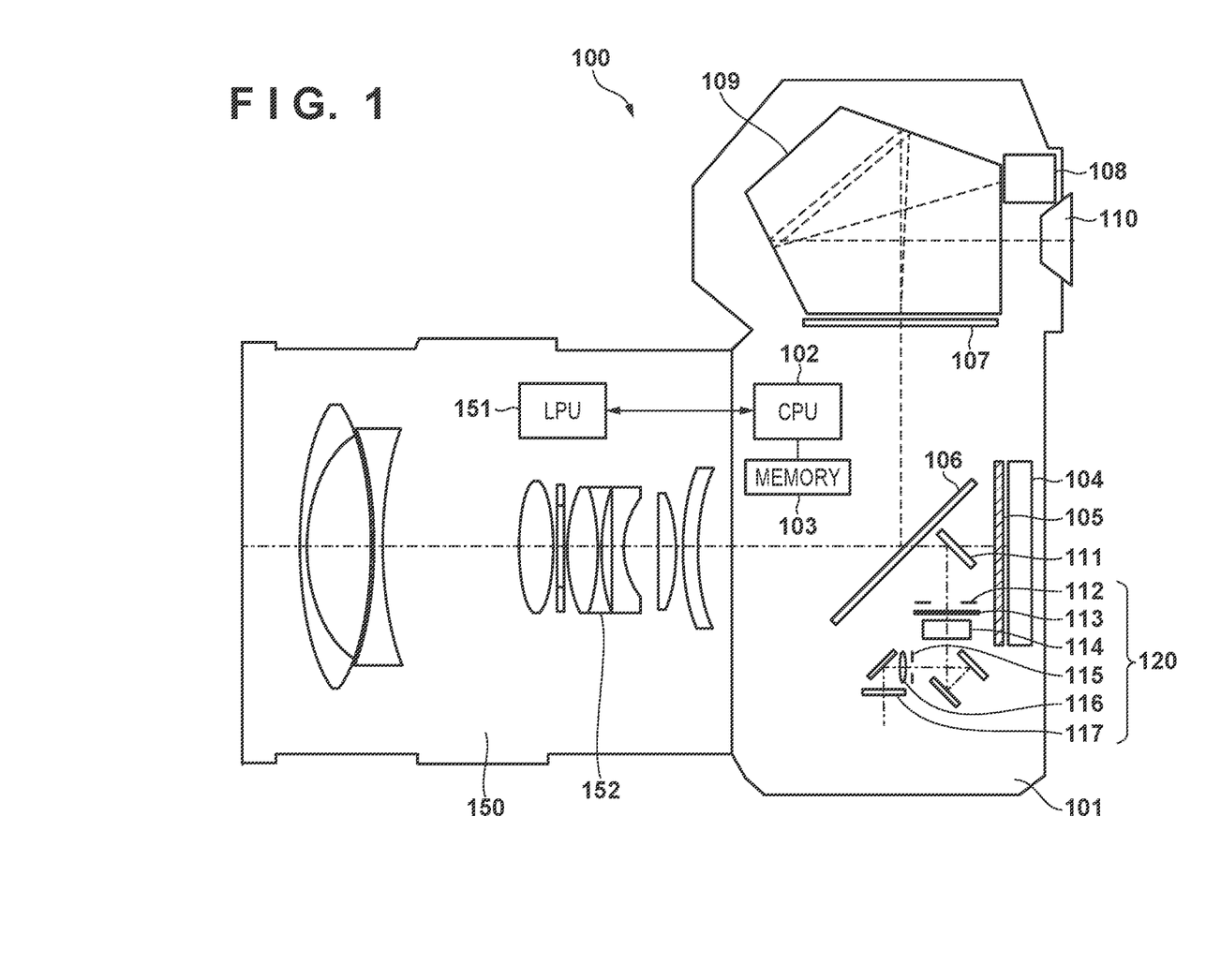
FIG. 1 is a side view of a digital camera used as an image capturing apparatus according to a first embodiment of the present invention.

FIG. 1 is a side view of a digital camera according to a first embodiment of an image capturing apparatus of the present invention.

In FIG. 1, the digital camera 100 includes a camera body 101 and a lens (image capturing lens) 150. Note that, in FIG. 1, the internal configuration is illustrated as transparent for easy description. The camera body 101 includes a CPU 102, a memory 103, an image capturing element 104, a shutter 105, a half mirror 106, a focusing screen 107, a photometric sensor 108, a pentaprism 109, an optical finder 110, and a sub-mirror 111. Furthermore, the camera body 101 includes a focus detection unit 120 including a field mask 112, an infrared cut filter 113, a field lens 114, a diaphragm 115, a secondary image forming lens 116, and a focus detection sensor (focus detecting sensor) 117. The lens 150 includes an LPU 151 and a lens group 152.

The CPU 102 includes a microcomputer and performs each type of control in the camera body 101. The memory 103 is a memory such as a RAM or a ROM connected to the CPU 102, and stores data and programs executed by the CPU 102. The image capturing element 104 includes a CCD or a CMOS sensor, or the like including an infrared cut filter and a low pass filter, and light incident on the lens 150 is formed into an object image. The shutter 105 can be driven to open and close, and is closed during non-image-capturing to shield the image capturing element 104 from light, while being open during image capturing to expose the image capturing element 104. The half mirror 106 reflects a portion of light incident on the lens 150 during non-image-capturing to form the portion into an image on the focusing screen 107. The photometric sensor 108 includes an image capturing element such as a CCD or a CMOS sensor, and performs object recognition processing such as a photometric operation, a face detection operation, a tracking operation, and a light source detection. The pentaprism 109 reflects, toward the photometric sensor 108 and optical finder 110, light having passed through the focusing screen 107.

The half mirror 106 transmits a portion of light incident on the lens 150. The transmitted light is bent downward by a rear sub-mirror 111, passes through the field mask 112, the infrared cut filter 113, the field lens 114, the diaphragm 115, and the secondary image forming lens 116, and is formed into an image on the focus detection sensor 117 in which photoelectric conversion elements are two-dimensionally arranged. The focus detection unit 120 detects a focus state of the lens 150 based on an image signal obtained by photoelectric conversion of the image.

The LPU 151 includes a microcomputer and performs control to move the lens group 152 in the lens 150. For example, upon receiving an amount of defocusing indicating the amount of focus shift from the CPU 102, the LPU 151 moves the lens group 152 to a position where focus can be achieved (hereinafter referred to as a "focusing position") based on the amount of defocusing.

Figure 2:
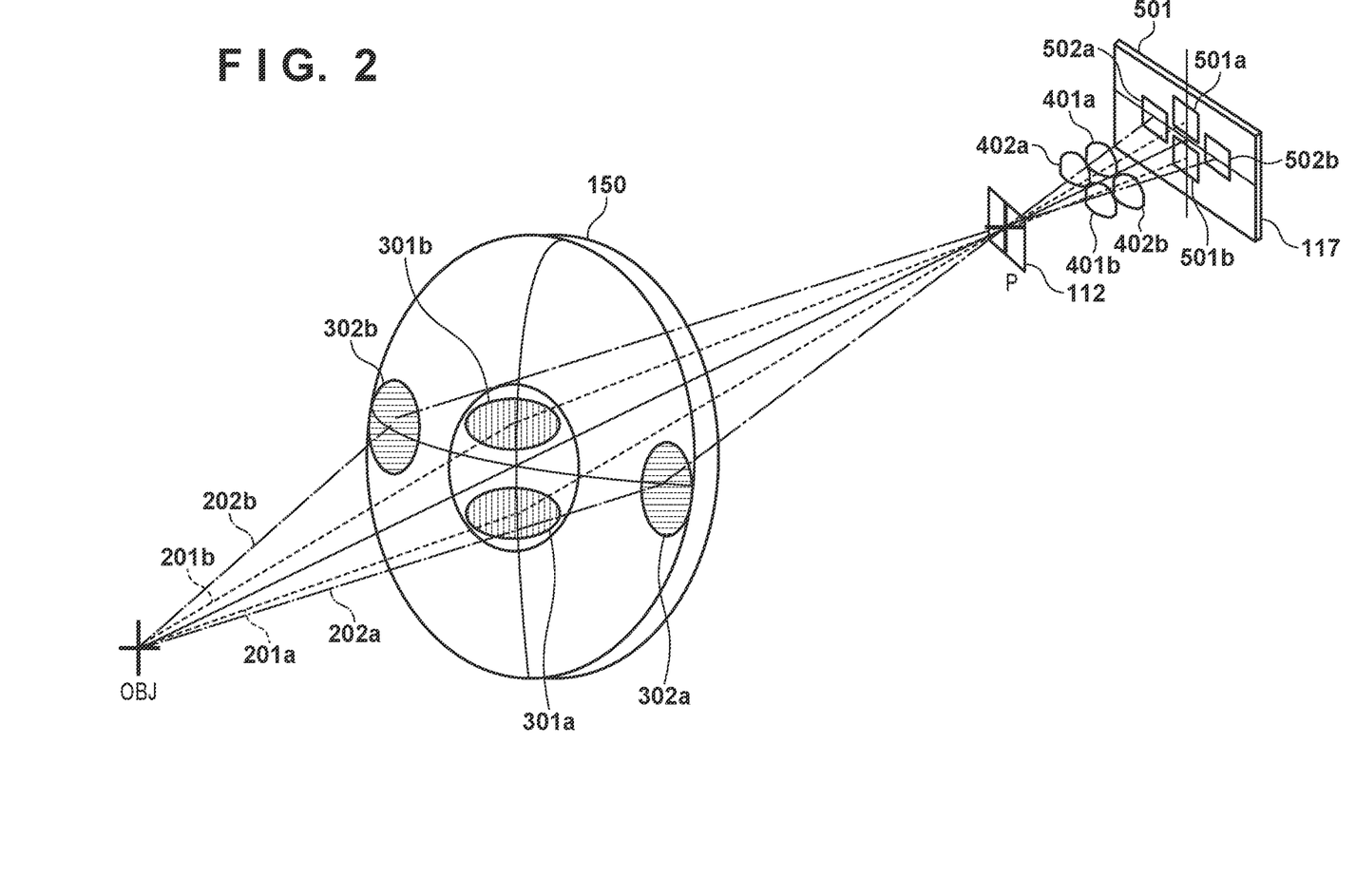
FIG. 2 is a perspective view schematically illustrating a configuration of a focus-detection optical system.

FIG. 2 is a diagram conceptually illustrating the principle of focus detection.

In FIG. 2, luminous fluxes 201a and 201b from an object OBJ pass through the pupils (pupil regions) 301a and 301b of the lens 150 and are formed into an image on a focus plane p (primary image forming surface) near the field mask 112. The luminous fluxes 201a and 201b are divided by secondary image forming lenses 401a and 401b, and the resultant luminous fluxes are re-formed into images in image forming areas 501a and 501b of the focus detection sensor 117. The correlation between the two vertically positioned object images is calculated to determine the amount of defocusing.

Similarly, luminous fluxes 202a and 202b pass through pupils 302a and 302b of the lens 150 is and are formed into images on the focal plane p (primary image forming surface) near the field mask 112. The luminous fluxes 202a and 202b are divided by secondary image forming lenses 402a and 402b, and the resultant luminous fluxes are re-formed into images in image forming areas 502a and 502b of the focus detection sensor 117. The correlation between two laterally positioned object images is calculated to determine the amount of defocusing. The image forming areas 502a and 502b correspond to the luminous fluxes 202a and 202b, having large base lengths and high focus detecting resolutions.

Figure 3:
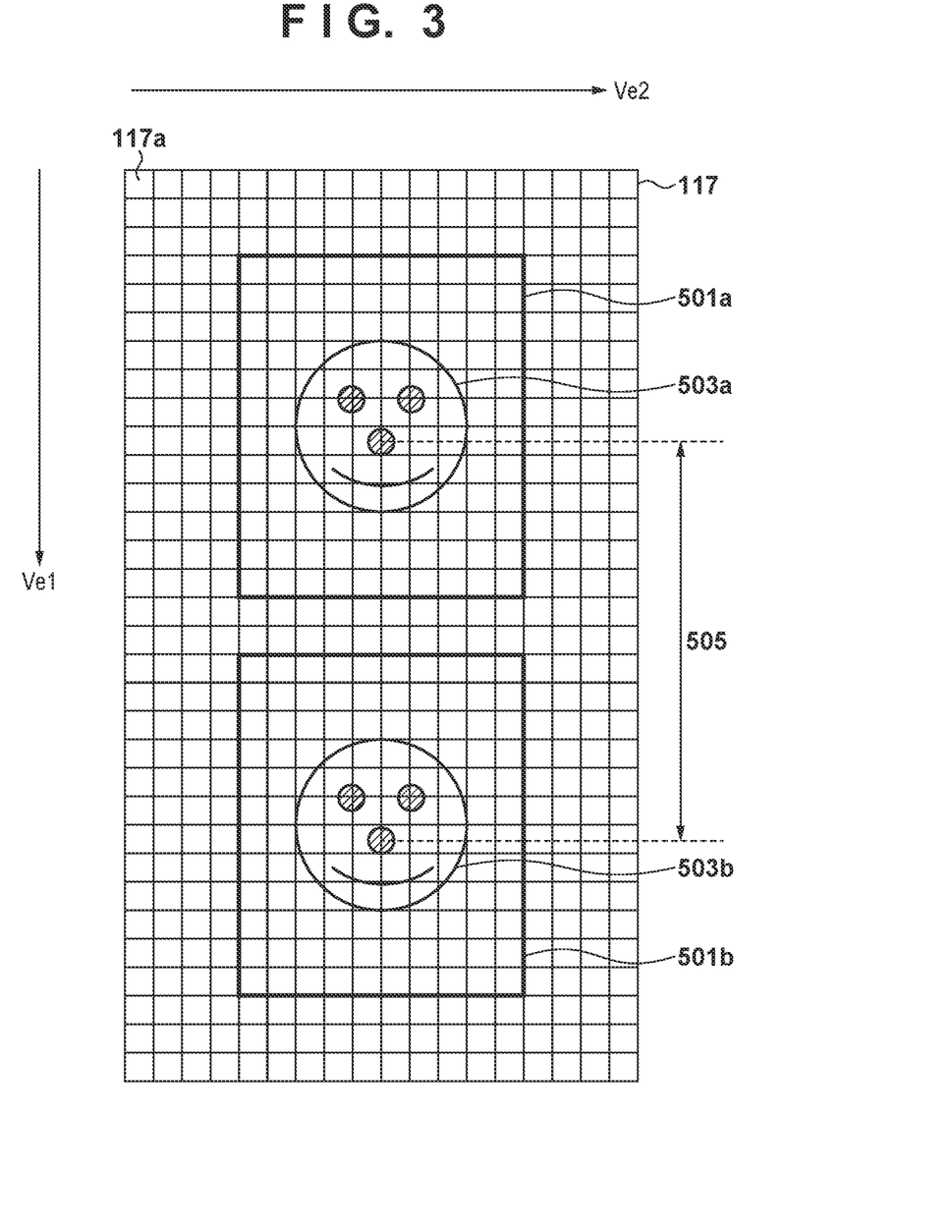
FIG. 3 is a diagram illustrating the positional relationship between optical images and pixels on a focus detection sensor.

FIG. 3 is a diagram illustrating the positional relationship between pixels and optical images on the focus detection sensor 117 into which the luminous fluxes 201a and 201b are formed.

The focus detection sensor 117 includes pixels 117a arranged in a two-dimensional array, and receives incident light to photoelectrically converts the light into an image signal and outputs the image signal. The secondary image forming lens 401a forms an object image 503a, and the secondary image forming lens 401b forms an object image 503b. Additionally, the image forming areas 501a and 501b including the object images 503a and 503b depend on the shape of a rectangular opening in the field mask 112.

A distance 505 is a relative distance between the object images 503a and 503b in the direction of the vector Ve1, corresponding to the base length direction of the secondary image forming lenses 401a and 401b. A change in focus state of the lens 150 varies the distance 505 in the direction of the vector Ve1. The distance between the image forming areas 501a and 501b is also equal to the distance 505, and the object images 503a and 503b completely overlap during focusing. In a case where the object image 503a is designated as an A image and the object image 503b is designated a B image, the amount of defocusing corresponding to the amount of focus shift can be calculated from the phase difference in the base length direction of the vectors of the two images (the direction of the vector Ve1).

On the other hand, a direction orthogonal to the base length of the secondary image forming lenses 401a and 401b is designated as the direction of the vector Ve2. Typically, no phase difference occurs between the object images 503a and 503b in the direction of the vector Ve2. However, if heat haze had occurred, it refracts and bends the luminous fluxes 201a and 201b, and thus even in the focus state, the A image and the B image move both in the direction of the vector Ve1 and in the direction of the vector Ve2. Conversely, by observing a temporal variation in phase difference in the direction of the vector Ve2, whether heat haze is occurring or not can be detected. The variation in phase difference in the direction of the vector Ve1 is not suitable for detecting heat haze because the variation corresponds to synthesis of a variation of the object in focus direction and a variation caused by the heat haze.

Figure 4:
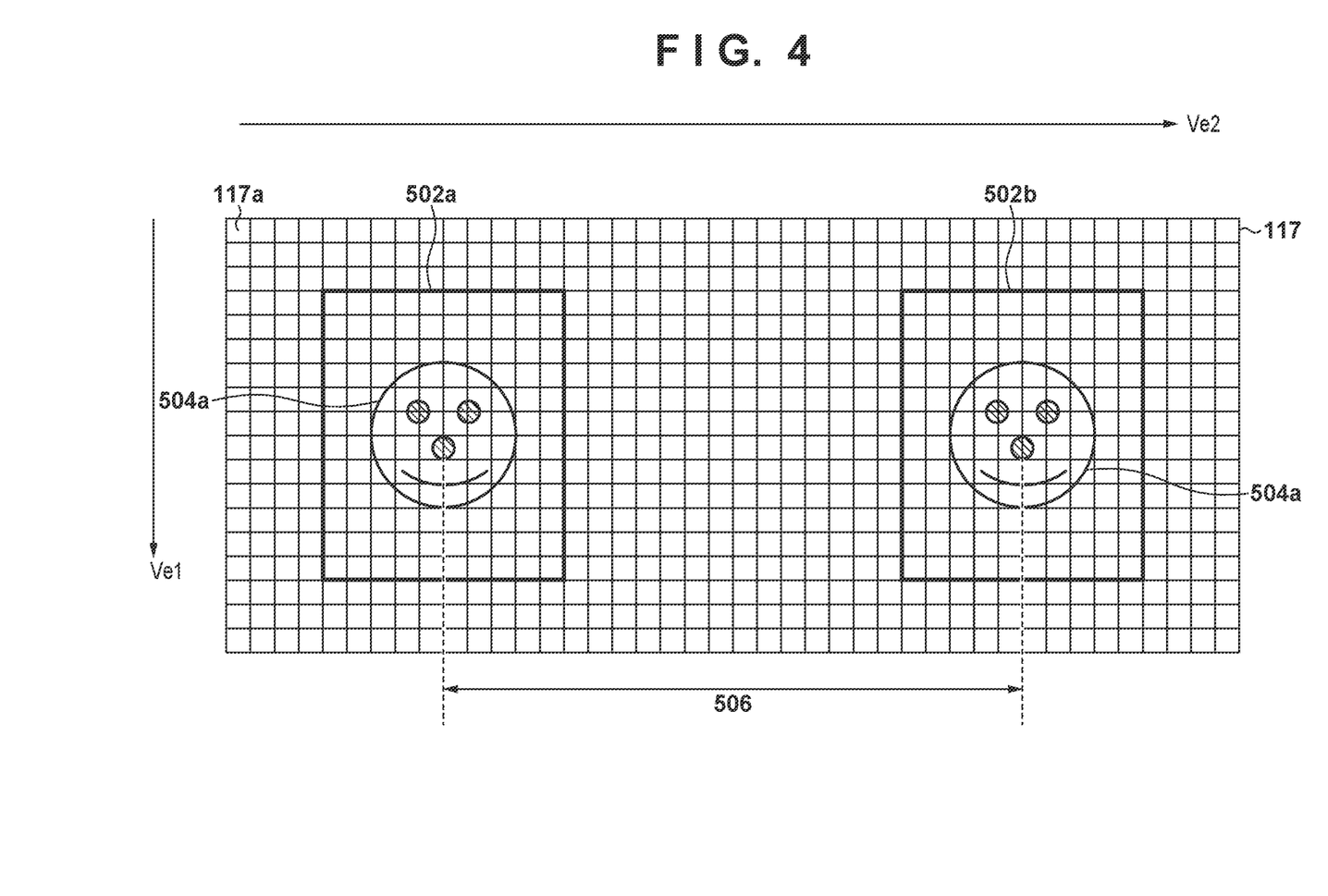
FIG. 4 is a diagram illustrating the positional relationship between optical images and the pixels on the focus detection sensor.

FIG. 4 is a diagram illustrating the positional relationship between the pixels and the optical images on the focus detection sensor 117, into which the luminous fluxes 202a and 202b are formed.

As described above, the focus detection sensor 117 includes the pixels 117a arranged in a two-dimensional array. The secondary image forming lens 402a forms an object image 504a, and the secondary image forming lens 402b forms an object image 504b. Additionally, the image forming areas 502a and 502b including the object images 504a and 504b depend on the shape of the rectangular opening in the field mask 112.

A distance 506 is a relative distance between the object images 504a and 504b in the direction of the vector Ve2, corresponding to the base length direction of the secondary image forming lenses 402a and 402b. A change in focus state of the lens 150 varies the distance 506 in the direction of the vector Ve2. The direction orthogonal to the base length of the secondary image forming lens 402a, 402b is the direction of the vector Ve1. In other words, as in FIG. 3, by observing a temporal variation in phase difference in the direction of the vector Ve1, in which no phase difference is to occur, whether heat haze is occurring can be detected.

As described above, heat haze can be detected from a variation in phase difference in the direction of the vector Ve2 in FIG. 3 and from a variation in phase difference in the direction of the vector Ve1 in FIG. 4. The heat haze is caused by a change in atmospheric density. For example, in a case where the ground is rapidly heated by sunlight, heat is dissipated into the air above the ground. At this time, the atmospheric density changes due to a temperature gradient occurring in the air in the vertical direction. At this time, the amount of change in air density in the direction of the vector Ve1 is greater than the amount of change in air density in the direction of the vector Ve2. In this way, the amounts of change in phase difference in the two directions allow detection of not only the presence or absence of distortion or fluctuation of the optical path caused by heat haze but also the direction of the distortion or fluctuation.

Figure 5:
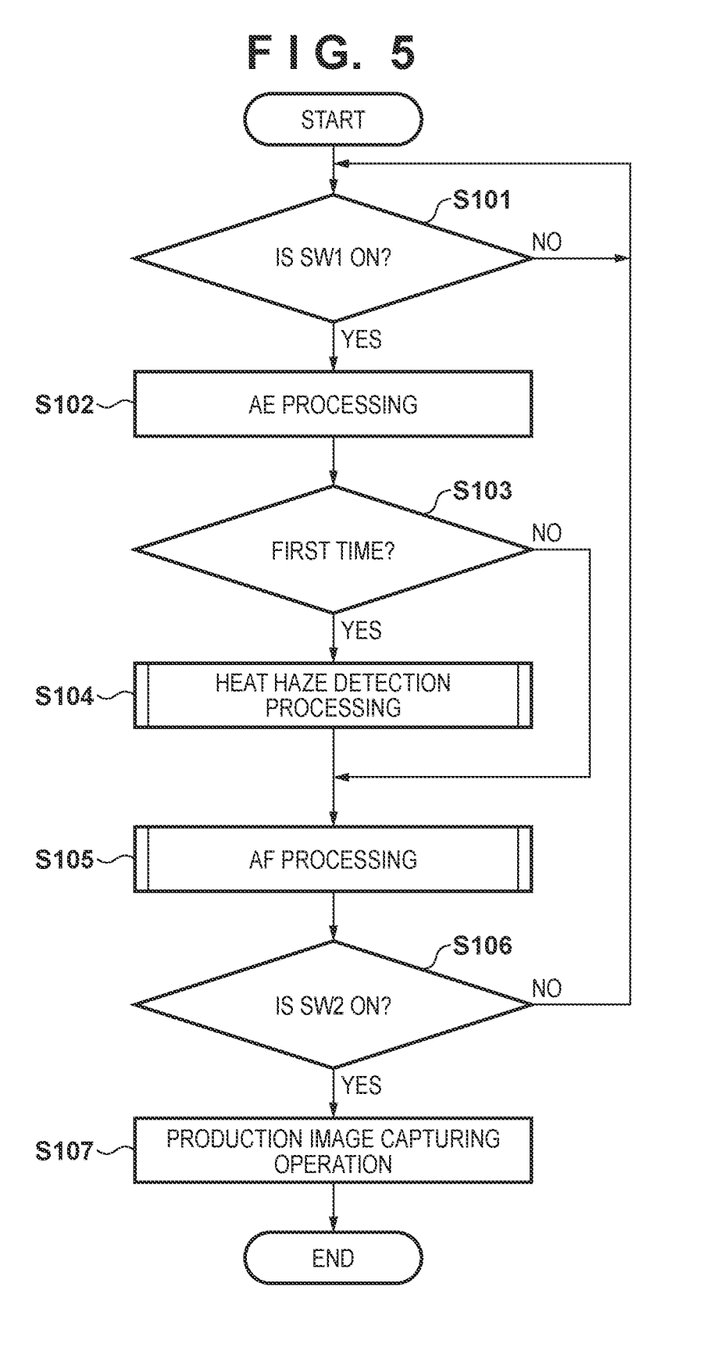
FIG. 5 is a flowchart illustrating operations of the digital camera according to the first embodiment.

Next, FIG. 5 is a flowchart illustrating steps of image capturing control processing performed by the digital camera 100. The processing in FIG. 5 is performed by the CPU 102 executing a program stored in the memory 103 on the assumption that the digital camera 100 has been activated.

First, in step S101 (hereinafter, "step" is omitted and only "S" is used to represent each step), the CPU 102 determines whether a shutter switch (release button) has been pressed halfway by the user to instruct image capturing (switch SW1 has been turned on). In a case where the switch SW1 has been turned on, the processing proceeds to S102, and otherwise the processing stands by without any change.

At S102, the CPU 102 controls the photometric sensor 108 to perform AE processing. As a result, a photometric value (hereinafter, "photometric value in steady light") is obtained that includes luminance information related to the object in steady light. In addition, based on the photometric value in steady light, the following are determined: an exposure control value such as an aperture value and ISO sensitivity during image capturing, and an accumulation time in the focus detection sensor 117.

At S103, the CPU 102 determines whether the AF processing described below is performed for the first time or not. In a case where this is the first (initial) operation, the processing proceeds to S104 to perform heat haze detection processing. On the other hand, in a case where the AF processing has performed once or a plurality of times, the heat haze detection processing is skipped and the processing proceeds to S105.

In S104 and S105, the CPU 102 controls the focus detection sensor 117 to perform heat haze detection processing and phase difference-based AF processing (autofocus operation). The CPU 102 transmits, to the LPU 151, the amount of defocusing calculated at S105. This causes the LPU 151 to move the lens group 152 to the focusing position based on the received amount of defocusing. Note that the details of the heat haze detection processing will be described below by using a flowchart in FIG. 6 and the details of the AF processing will be described below by using a flowchart in FIG. 7.

At S106, the CPU 102 determines whether the shutter switch has been fully pressed (switch SW2 has been turned on) by the user or not. In a case where the switch SW2 is on, the processing proceeds to S107, and in a case where the switch SW2 is not on, the processing returns to S101.

In S107, the CPU 102 performs production image capturing and ends the processing in the flowchart. The overall operation of the digital camera 100 according to the present embodiment has been described.

As described above, by performing the heat haze detection processing only at the timing of the initial operation during image capturing, a release time lag involved in the image capturing can be reduced.

Furthermore, although the heat haze detection processing is performed by turning on the switch SW1 in FIG. 5, the heat haze detection may be performed by operating another operation member. Even in that case, the user can perform the heat haze detection and the image capturing operation at different timings, and thus the release time lag involved in the image capturing can further be reduced.

Figure 6:
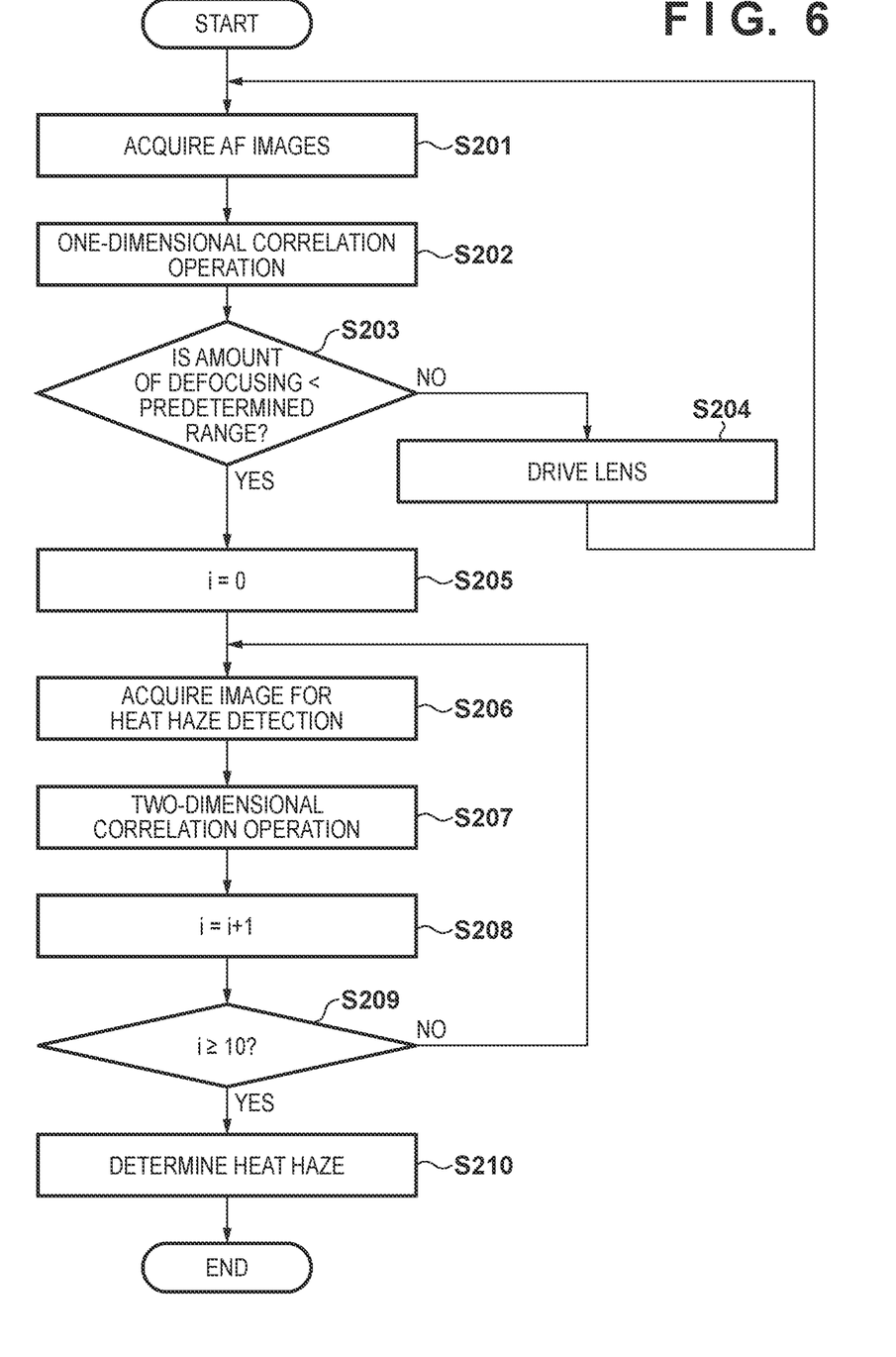
FIG. 6 is a flowchart illustrating heat haze detection processing according to the first embodiment.

FIG. 6 is a flowchart illustrating a procedure for heat haze detection processing in S104 in FIG. 5.

First, at S201, the CPU 102 controls the focus detection sensor 117 based on the accumulation time determined by the operation in S102 in FIG. 5 based on the photometric value including object luminance information. Then, a pair of images for AF is acquired (the object images 503a and 504a, corresponding to the A image illustrated in FIG. 3 and FIG. 4, and the object image 503b and 504b, corresponding to the B image illustrated in FIG. 3 and FIG. 4).

At S202, the CPU 102 extracts a predetermined range from each of the image forming areas 501a and 501b (FIG. 3) including the object images 503a and 503b on the focus detection sensor 117 obtained at S201, and performs a correlation operation on the direction of the vector Ve1. A result obtained is designated as a first AF result. Additionally, a predetermined range is extracted from each of the image forming areas 502a and 502b (FIG. 4) including the object images 504a and 504b on the focus detection sensor 117, and a correlation operation is performed on the direction of the vector Ve2. A result obtained is designated as a second AF result. One of the first AF result and the second AF result is selected, and the final amount of defocusing is determined. A selection method is not particularly limited, but one of the results that involves a more reliable amount of defocusing indicated by high correlation or contrast between the waveforms of image signals.

At S203, the CPU 102 determines whether the amount of defocusing calculated at S202 is within a predetermined range. Specifically, an amount of defocusing of 200 µm or less is determined to indicate that the focus is nearly achieved, and the processing proceeds to S205 and subsequent operations. On the other hand, in a case where the amount of defocusing is greater than 200 µm, then at S204, the CPU 102 indicates, to the LPU 151, the amount of lens driving corresponding to the amount of defocusing determined at S202. The LPU 151 moves the lens group 152 based on the amount of lens driving. Then, the CPU 102 returns the processing back to S201 and repeats the operations at S201 to S204 until it is determined S203 to be near focus.

At S205, the CPU 102 initializes the number of image acquisitions i for heat haze detection.

At S206, the CPU 102 sets the accumulation time (exposure time) half the accumulation time required to acquire the AF image at S201, and causes the focus detection sensor 117 to perform an accumulation operation. For detection of heat haze, on the assumption that a variation in optical path caused by heat haze is periodic, sampling needs to be faster than its period. Setting a short accumulation time allows more accurate detection of the amount of variation in optical path caused by heat haze.

At S207, the CPU 102 extracts a predetermined range from each of the image forming areas 501a and 501b (FIG. 3) including the object images 503a and 503b on the focus detection sensor 117 obtained at S206, performs a two-dimensional correlation operation on two directions including the direction of the vector Ve1 and the direction of the vector Ve2, and stores a result of the operation. In addition, a predetermined range is extracted from each of the image forming areas 502a and 502b (FIG. 4) including the object images 504a and 504b on the focus detection sensor 117, a two-dimensional correlation operation is performed on the two directions including the direction of the vector Ve1 and the direction of the vector Ve2, and a result of the operation is stored.

At S208, the number of image acquisitions i for heat haze detection is incremented.

At S209, the CPU 102 determines the number of image acquisitions i for heat haze detection. The operations at S206 and S207 are repeated until i is 10 or more (calculation is performed a plurality of times).

At S210, whether heat haze is occurring is determined based on the result of the two-dimensional correlation operation stored at S207. Specifically, from the result of the two-dimensional correlation operation at S207, the amount of variation in phase difference in the direction orthogonal to the base length is calculated. The amount of variation in phase difference in the direction of the vector Ve2 orthogonal to the base length direction is calculated from a phase difference calculated from the object images 503a and 503b. Here, heat haze is determined to be occurring in a case where the difference between the maximum value and the minimum value of the phase difference detected 10 times is greater than or equal to a predetermined value. In addition, the amount of variation in phase difference in the direction of the vector Ve1 orthogonal to the base length is calculated from the phase difference calculated from the object images 504a and 504b, and determination similar to the determination described above is performed. Then, the amounts of variation in the direction of the vector Ve1 and the direction of the vector Ve2 are stored, and the sequence of steps of heat haze detection processing is ended.

As described above, the operations at S201 to S204 are performed to acquire an image for heat haze detection when the focus is nearly achieved. When the focus is nearly achieved, the contrast of an image signal on the focus detection sensor 117 is higher, increasing the accuracy of the two-dimensional correlation operation during the operation at S207. Additionally, the correlation range in the base length direction can be limited, enabling a reduction in calculation time.

Figure 7:
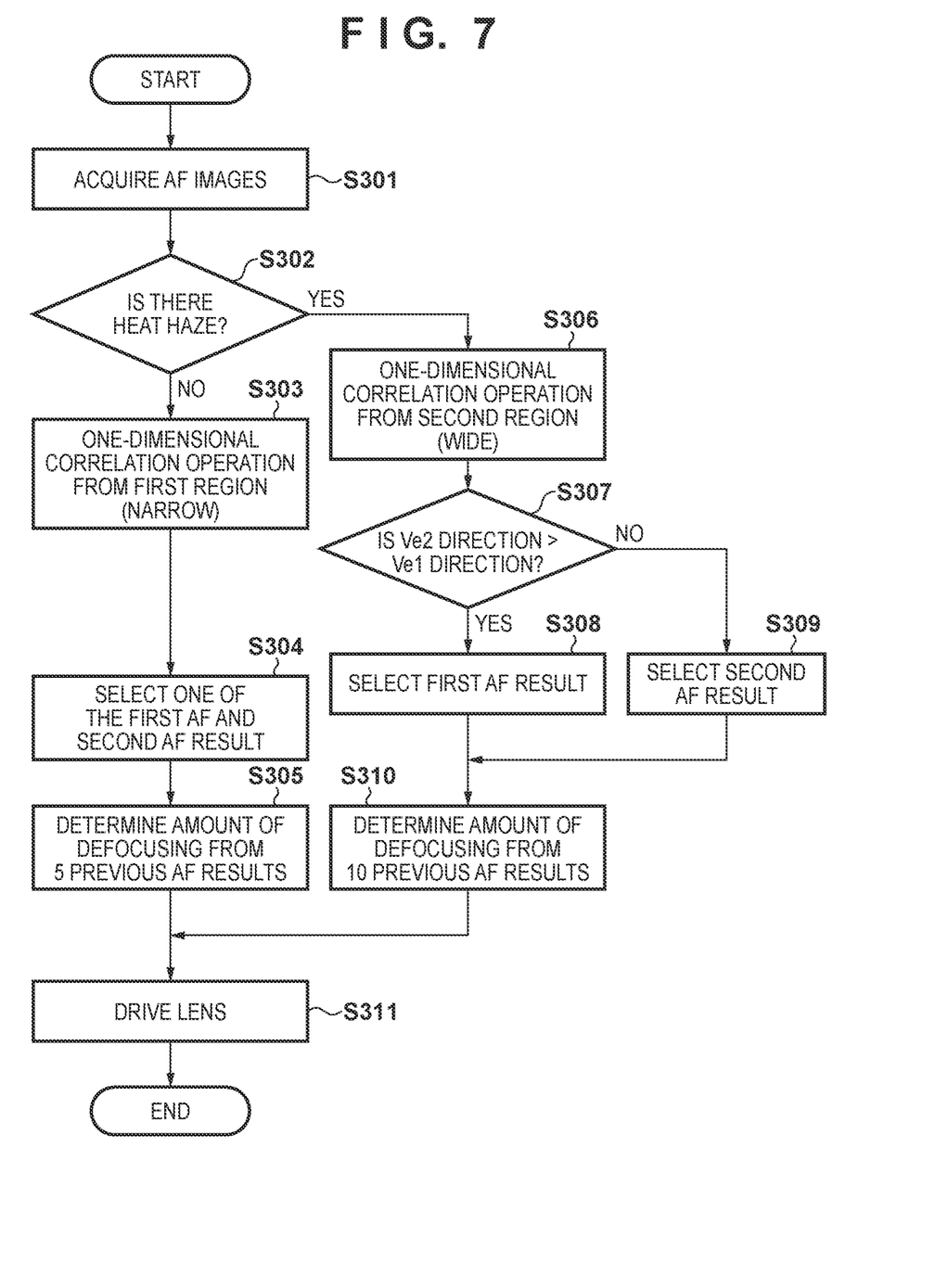
FIG. 7 is a flowchart illustrating AF processing according to the first embodiment.

FIG. 7 is a flowchart illustrating a procedure for the AF processing at step S105 in FIG. 5.

First, at S301, the CPU 102 causes the focus detection sensor 117 to perform an accumulation operation for the accumulation time determined based on the photometric value including object luminance information determined at S102 in FIG. 5.

At S302, the CPU 102 determines whether heat haze has been detected based on the result of the heat haze detection processing at S104 in FIG. 5 (processing in FIG. 6), and in a case where no heat haze has been detected, then the processing proceeds to S303. On the other hand, in a case where heat haze has been detected, then the processing proceeds to S306.

A method for determining the amount of defocusing will be described in a case where no heat haze has been detected at S303 to S305.

At S303, the CPU 102 extracts a first predetermined range from each of the image forming areas 501a and 501b including the object images 503a and 503b on the focus detection sensor 117 obtained at S301, and performs a two-dimensional correlation operation on the direction of the vector Ve1. A result obtained is designated as a first AF result. In addition, the first predetermined range is extracted from each of the image forming areas 502a and 502b including the object images 504a and 504b on the focus detection sensor 117, a correlation operation is performed on the direction of the vector Ve2, and a result obtained is designated as a second AF result.

At S304, the CPU 102 selects one of the first AF result and the second AF result obtained by the operation at S303. The selection method is not particularly limited, but in the same manner as the operation of S202 in FIG. 6, one of the selection methods is selected that is considered to involve a reliable AF result indicated by high correlation between the waveforms of image signals or high contrast.

At S305, the CPU 102 calculates the amount of defocusing from up to five AF results obtained by the operation at S304. Note that the AF processing in FIG. 7 is repeatedly performed after the switch SW1 is turned on and before the switch SW2 is turned on in the flowchart of FIG. 5, and thus the amount of defocusing can be calculated using a plurality of AF results. Before the predetermined number is reached, the number of AF results obtained may be used for the calculation. In a case where the object is stationary, the amount of defocusing is calculated from the average value of up to five AF results. On the other hand, in a case where the object is a moving body, an object speed on an image capturing plane is calculated from the up to five AF results. Then, the amount of defocusing at the timing when the lens is driven is predicted.

A method for determining the amount of defocusing will be described in a case where heat haze has been detected at S306 to S310.

At S306, the CPU 102 extracts a second range wider than the first range from each of the image forming areas 501a and 501b including the object images 503a and 503b on the focus detection sensor 117 obtained at S301, and performs a correlation operation on the direction of the vector Ve1. A result obtained is designated as a first AF result. Additionally, the second range larger than the first range is extracted from each of the image forming areas 502a and 502b including the object images 504a and 504b on the focus detection sensor 117, a correlation operation is performed on the direction of the vector Ve2, and a result obtained is designated as a second AF result.

Figure 8:
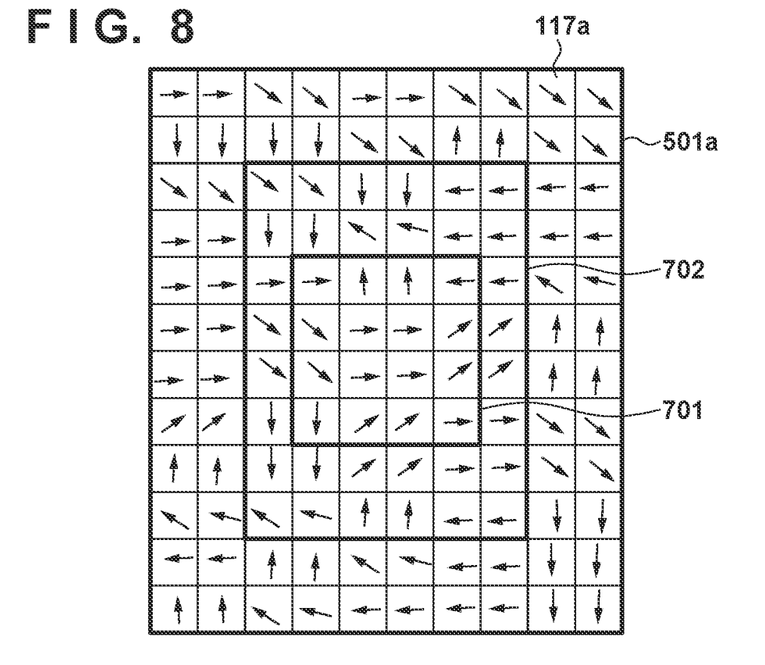
FIG. 8 is a diagram illustrating a relationship between a first range and a second range corresponding to ranges for correlation operations.

FIG. 8 is a diagram illustrating the positional relationship between the first range and the second range in the image forming area 501a including the object image 503a.

In FIG. 8, 701 denotes the first range, and 702 denotes the second range. Additionally, the directions of variations in optical paths caused by heat haze are indicated by arrows on the pixels in FIG. 8. In the first and second ranges corresponding to ranges for the correlation operations, a variation in optical path caused by heat haze does not occur in a single direction. In this case, using the second range 702, corresponding to a wide pixel range, for a correlation operation increases the probability at which the directions of variations cancel each other, increasing calculation quality. However, a widened calculation range may lead to a problem in that the background of the main object is in focus. In other words, desirably, the range of the correlation operation is set to the first range 701, corresponding to a narrow pixel range as in the operation at S303, in a case where no heat haze is present, whereas the range of the correlation operation is set to the second range 702, corresponding to a wide pixel range as described above, in a case where heat haze is present.

At S307, the CPU 102 determines a heat haze direction from the result of the heat haze detection processing (processing in FIG. 6) at S104 in FIG. 5. Specifically, the following method is used.

In a case where the amount of variation in phase difference in the direction of the vector Ve2 is greater than the amount of variation in phase difference in the direction of the vector Ve1, the second AF result, in which the direction of the vector Ve2 is used as the base length direction, has a significant error due to heat haze. Thus, the processing proceeds to S308 to select the first AF result.

On the other hand, in a case where the amount of variation in phase difference in the direction of the vector Ve2 is smaller than or equal to the amount of variation in phase difference in the direction of the vector Ve1, the processing proceeds to S309 to select the second AF result. Even in a case where the amount of variation in phase difference in the direction of the vector Ve2 is the same as the amount of variation in phase difference in the direction of the vector Ve1, the second AF result with a long base length is selected that is less susceptible to heat haze. Even in a case of involving the same error as that of the first AF result, the second AF result, which has a long base length and high focus detection resolution, involves a smaller amount of variation in focus in terms of the amount of defocusing.

At S310, the CPU 102 calculates the amount of defocusing based on up to 10 AF results obtained by the operation at S308 or S309. In a case where the object is a stationary object, the amount of defocusing is calculated from the average value of the up to 10 AF results. On the other hand, in a case where the object is a moving body, the object speed on the image capturing plane is calculated from the up to 10 AF results. Then, the amount of defocusing at the timing when the lens is driven is predicted and calculated. By performing calculation using more AF results than in the operation at S305, which uses five AF results, an error caused by heat haze can be reduced.

At S311, the CPU 102 indicates, to the LPU 151, the amount of lens driving corresponding to the amount of defocusing determined in the operation at S305 or S310, and the LPU 151 drives the lens to complete a series of AF operations.

Second Embodiment

Next, a second embodiment will be described. A configuration of a digital camera according to the second embodiment is similar to that of the first embodiment illustrated in FIG. 1. In the second embodiment, focus detection is performed using the image capturing element 104. The image capturing element 104 is a two-dimensional C-MOS area sensor and has a circuit configuration similar to that of the focus detection sensor 117.

Figure 9:
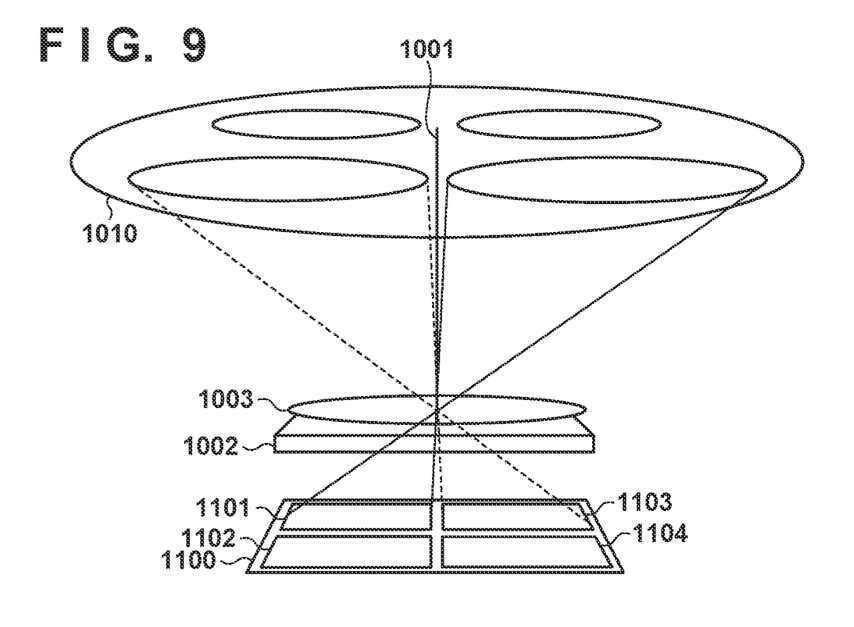
FIG. 9 is a perspective view schematically illustrating a configuration of a focus-detection optical system according to a second embodiment.

FIG. 9 is a conceptual diagram illustrating that a luminous flux emitted from an exit pupil of the lens 150 is incident on a unit pixel in the image capturing element 104.

In FIG. 9, a unit pixel 1100 in the image capturing element 104 includes 2×2 photodiodes 1101, 1102, 1103, and 1104. A color filter 1002 and a microlens 1003 are disposed in front of the unit pixel 1100. The lens 150 includes an exit pupil 1010. Assuming that the center of a luminous flux emitted from the exit pupil 1010 is an optical axis 1001, light having passed through the exit pupil 1010 enters the unit pixel 1100 around the optical axis 1001. The 2×2 photodiodes 1101, 1102, 1103, and 1104 divide the exit pupil 1010 of the lens 150 into four divisions. Focus detection is enabled by varying combinations each of two of the photodiodes 1101, 1102, 1103, and 1104 having different pupil positions to form the A image and the B image.

Figure 10A:
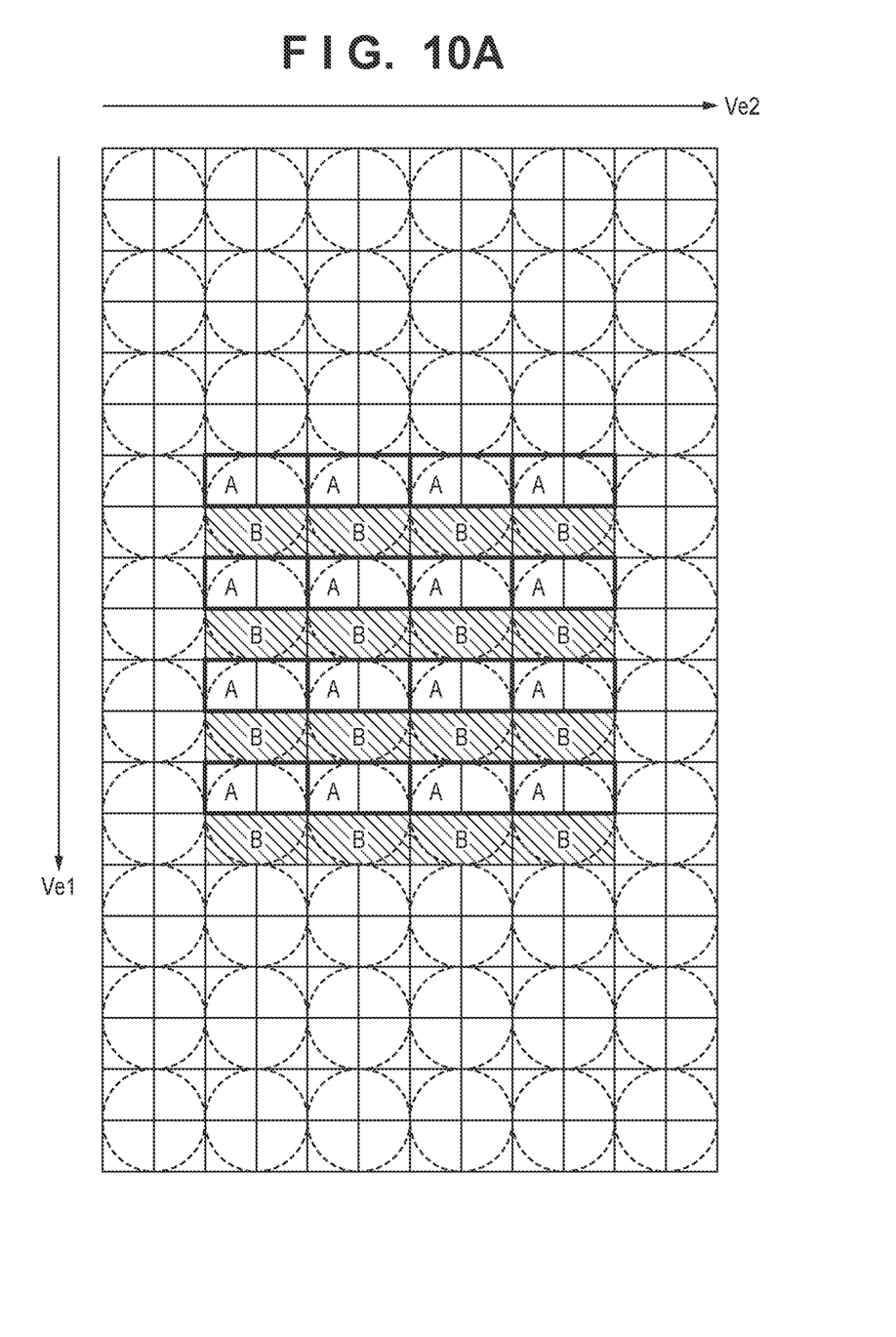
FIG. 10A is a diagram illustrating a method of forming A images and B images from a part of arrangement of pixels in an image capturing element according to the second embodiment.
Figure 10B:
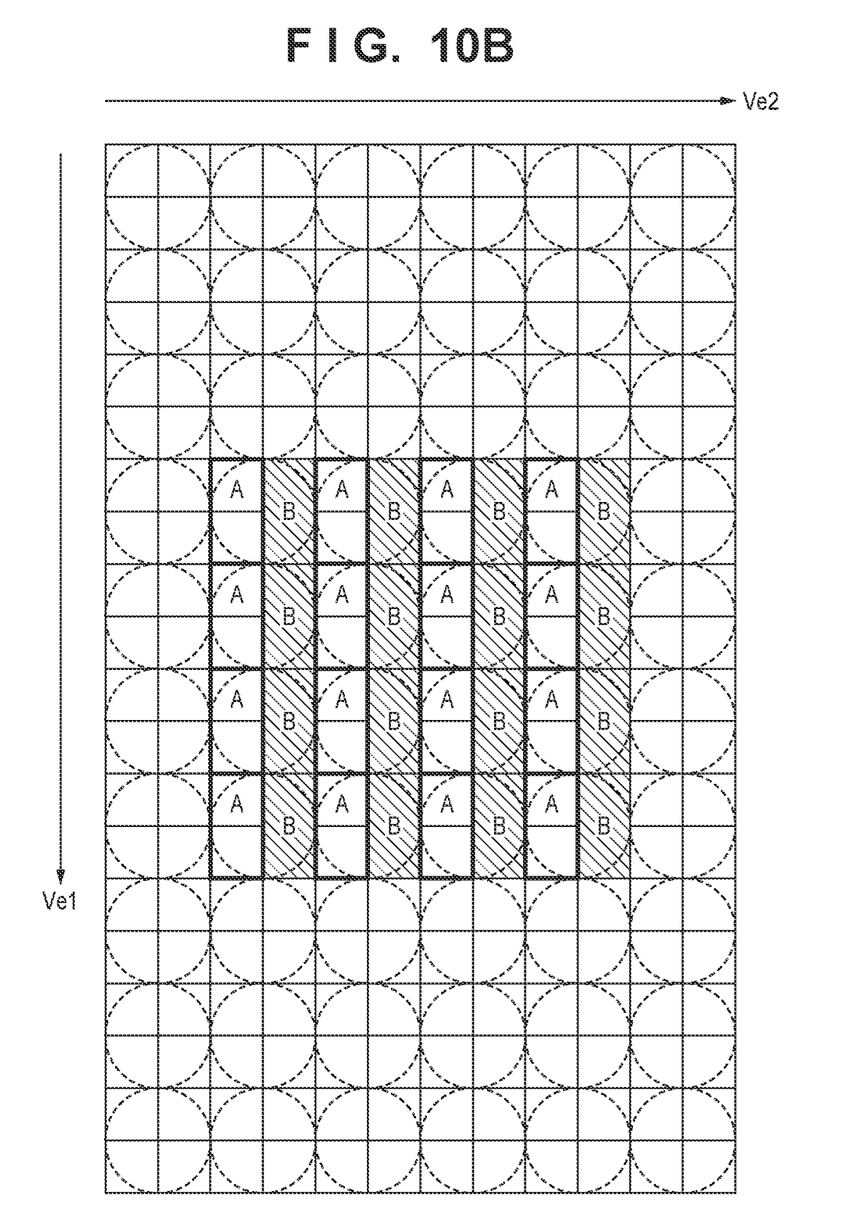
FIG. 10B is a diagram illustrating a method of forming A images and B images from a part of arrangement of pixels in the image capturing element according to the second embodiment.

FIGS. 10A and 10B are plan views illustrating a method of forming A images and B images from a part of the arrangement of pixels in the image capturing element 104.

2×2 pixels surrounded by dashed round frames in FIG. 10A correspond to the unit pixel 1100. Two pixels enclosed by a thick frame are added together in the horizontal direction to form an A image signal. Two hatched pixels are added together in the horizontal direction to form a B image signal. As in FIG. 3, since the base length direction is the direction of the vector Ve1, whether heat haze is occurring or not can be detected by observing a temporal variation in phase difference in the direction of the vector Ve2.

FIG. 10B is a diagram illustrating an example in which two pixels are added together in the vertical direction to form an A image signal and a B image signal. Two pixels enclosed by a thick frame are added together in the vertical direction to form an A image signal. Two hatched pixels are added together in the vertical direction to form a B image signal. As in FIG. 4, since the base length direction is the direction of the vector Ve2, whether heat haze is occurring or not can be detected by observing a temporal variation in phase difference in the direction of the vector Ve1.

As described above, the digital camera according to the present embodiment, which performs focus detection by the image capturing element 104 forming A image signals and B image signals for correlation operations, enables detection of not only the presence or absence of distortion or fluctuation of the optical path caused by heat haze but also the direction of the distortion or fluctuation based on the amount of variation in phase difference in the two directions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-114932, filed Jun. 20, 2019, which is hereby incorporated by reference herein in its entirety.

What is claimed is:

1. An image capturing apparatus comprising:
   a light receiving sensor including two-dimensionally arranged pixels and configured to photoelectrically convert a pair of object images having passed through a first pupil region and a second pupil region into which a pupil region of an image capturing lens is divided in a first direction and to output a first image signal and a second image signal, each of the first image signal and the second image signal corresponding to a respective object image of the pair of object images; and
   at least one processor or circuit configured to function as:
   a calculation unit configured to calculate a first phase difference between the first image signal and the second image signal in the first direction and a second phase difference between the first image signal and the second image signal in a second direction orthogonal to the first direction;
   a focus detection unit configured to calculate a first focus detection result based on the first phase difference; and
   a determination unit configured to determine presence or absence of heat haze based on the second phase difference.

2. The image capturing apparatus according to claim 1, wherein the calculation unit calculates the second phase difference a plurality of times, and the determination unit determines the presence or absence of heat haze based on a variation in the second phase difference.

3. The image capturing apparatus according to claim 2, wherein the determination unit determines that heat haze is present in a case where a difference between a maximum value and a minimum value of the variation in the second phase difference is greater than or equal to a first predetermined value.

4. The image capturing apparatus according to claim 1, wherein the light receiving sensor further photoelectrically converts a first pair of object images having passed through a third pupil region and a fourth pupil region into which the pupil region of the image capturing lens is divided in the second direction and outputs a third image signal and a fourth image signal, each of the third image signal and the fourth image signal corresponding to a respective object image of the first pair of object images, and the calculation unit further calculates a third phase difference between the third image signal and the fourth image signal in the second direction and a fourth phase difference between the third image signal and the fourth image signal in the first direction.

5. The image capturing apparatus according to claim 4, wherein a base length for the third pupil region and the fourth pupil region is greater than a base length for the first pupil region and the second pupil region.

6. The image capturing apparatus according to claim 4, wherein the focus detection unit calculates a second focus detection result based on the third phase difference.

7. The image capturing apparatus according to claim 4, wherein the determination unit determines the presence or absence of heat haze further based on the fourth phase difference.

8. The image capturing apparatus according to claim 7, wherein the calculation unit calculates the fourth phase difference a plurality of times, and the determination unit further determines that heat haze is present in a case where a difference between a maximum value and a minimum value of a variation in the fourth phase difference is greater than or equal to a second predetermined value.

9. The image capturing apparatus according to claim 1, wherein the at least one processor or circuit is configured to the further function as:
   a control unit configured to control the determination unit to execute determination of the presence or absence of heat haze only in an initial autofocus operation.

10. The image capturing apparatus according to claim 9, wherein the control unit controls the determination unit to execute determination of the presence or absence of heat haze after focusing the image capturing lens based on a focus detection result obtained by the focus detection unit.

11. The image capturing apparatus according to claim 9, wherein the control unit sets an exposure time for the light receiving sensor in a case where the determination unit determines the presence or absence of heat haze shorter than an exposure time for the light receiving sensor in a case where the focus detection unit performs focus detection.

12. The image capturing apparatus according to claim 4, wherein the focus detection unit performs focus detection based on a signal extracted from a first range of the first to fourth image signals in a case where the determination unit determines that no heat haze is present.

13. The image capturing apparatus according to claim 12, wherein the focus detection unit performs focus detection based on a signal extracted from a second range of the first to fourth image signals, the second range being wider than the first range, in a case where the determination unit determines that heat haze is present.

14. The image capturing apparatus according to claim 13, wherein the focus detection unit calculates an amount of defocusing from a focus detection result obtained by a plurality of focus detections.

15. The image capturing apparatus according to claim 14, wherein the focus detection unit sets a number of the plurality of focus detections greater in a case where the determination unit determines heat haze to be present than in a case where the determination unit determines heat haze to be absent.

16. The image capturing apparatus according to claim 6, wherein the at least one processor or circuit is configured to further function as:
   a selection unit configured to select between the first focus detection result and the second focus detection result, the selection unit selecting the first focus detection result in a case where the determination unit determines heat haze to be present and a variation in the second phase difference is greater than a variation in the first phase difference.

17. The image capturing apparatus according to claim 16, wherein the selection unit selects the second focus detection result in a case where the determination unit determines heat haze to be present and the variation in the second phase difference is smaller than or equal to the variation in the first phase difference.

18. The image capturing apparatus according to claim 1, further comprising an operation member configured to instruct the determination unit to determine presence or absence of heat haze.

19. The image capturing apparatus according to claim 18, wherein the operation member is a release button.

20. The image capturing apparatus according to claim 18, wherein the operation member is an operation member provided separately from the release button.

21. A control method for an image capturing apparatus, the method comprising:
  by a light receiving sensor including two-dimensionally arranged pixels, photoelectrically converting a pair of object images having passed through a first pupil region and a second pupil region into which a pupil region of an image capturing lens is divided in a first direction and outputting a first image signal and a second image signal, each of the first image signal and the second image signal corresponding to a respective object image of the pair of object images;
  calculating a first phase difference between the first image signal and the second image signal in the first direction and a second phase difference between the first image signal and the second image signal in a second direction orthogonal to the first direction;
  calculating a first focus detection result based on the first phase difference; and
  determining presence or absence of heat haze based on the second phase difference.

22. A non-transitory computer readable storage medium storing a program for causing a computer to execute each of the steps of a control method for an image capturing apparatus, the method comprising:
  by a light receiving sensor including two-dimensionally arranged pixels, photoelectrically converting a pair of object images having passed through a first pupil region and a second pupil region into which a pupil region of an image capturing lens is divided in a first direction and outputting a first image signal and a second image signal, each of the first image signal and the second image signal corresponding to a respective object image of the pair of object images;
  calculating a first phase difference between the first image signal and the second image signal in the first direction and a second phase difference between the first image signal and the second image signal in a second direction orthogonal to the first direction;
  calculating a first focus detection result based on the first phase difference; and
  determining presence or absence of heat haze based on the second phase difference.

* * * * *